May 12, 1942.  G. M. BUTTERS  2,282,704
AUTOMOTIVE VEHICLE WITH DETACHABLE LOADING HEAD
Filed Sept. 11, 1939  4 Sheets-Sheet 1

INVENTOR.
George M. Butters.
BY Harold W. Hawkins
ATTORNEY.

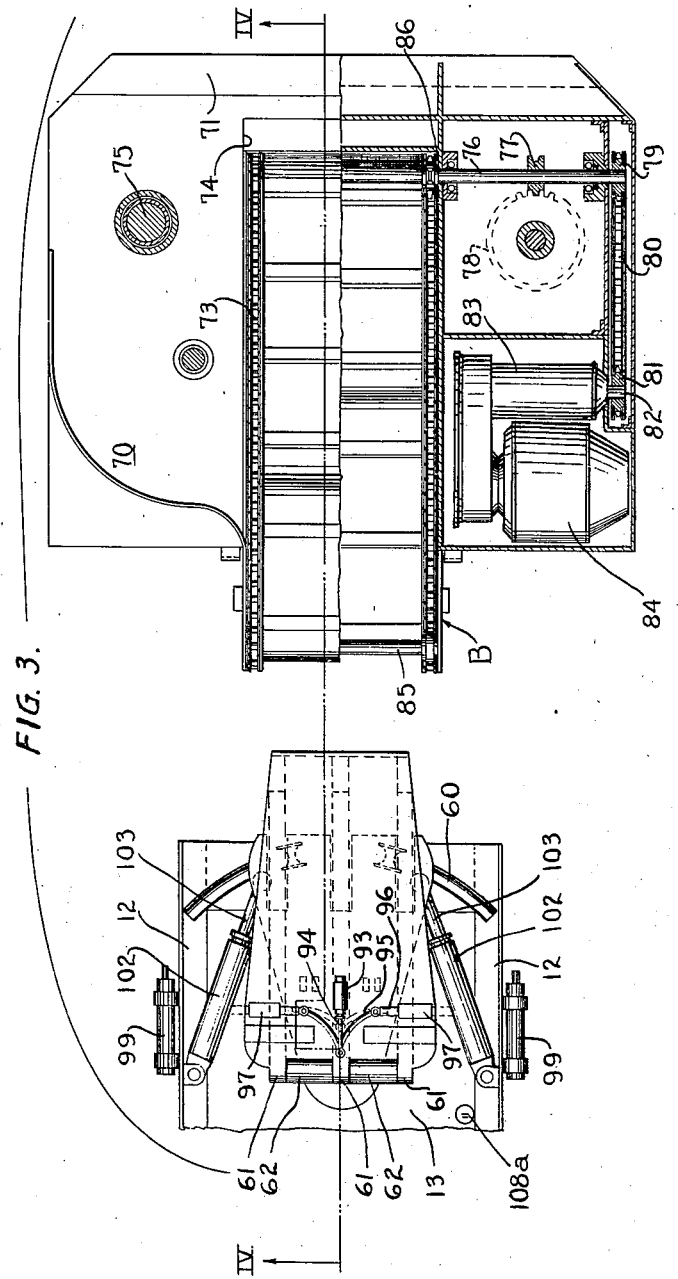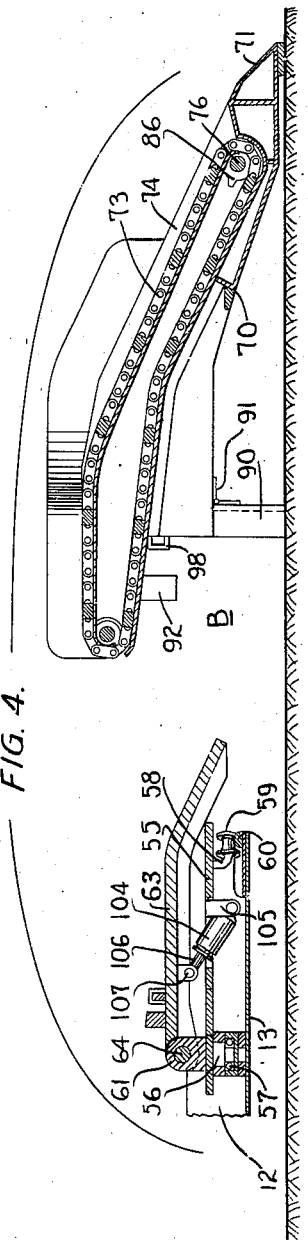

May 12, 1942. G. M. BUTTERS 2,282,704
AUTOMOTIVE VEHICLE WITH DETACHABLE LOADING HEAD
Filed Sept. 11, 1939 4 Sheets-Sheet 3
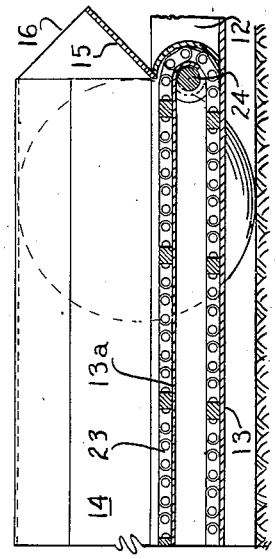
FIG. 7.
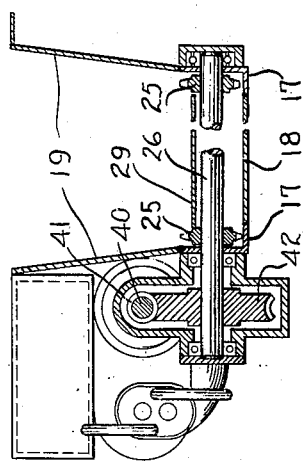
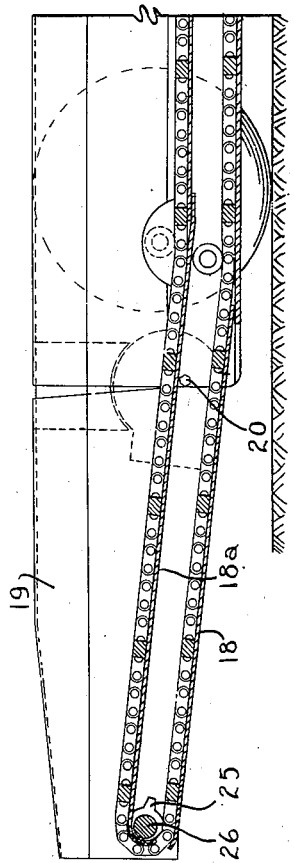
FIG. 5.
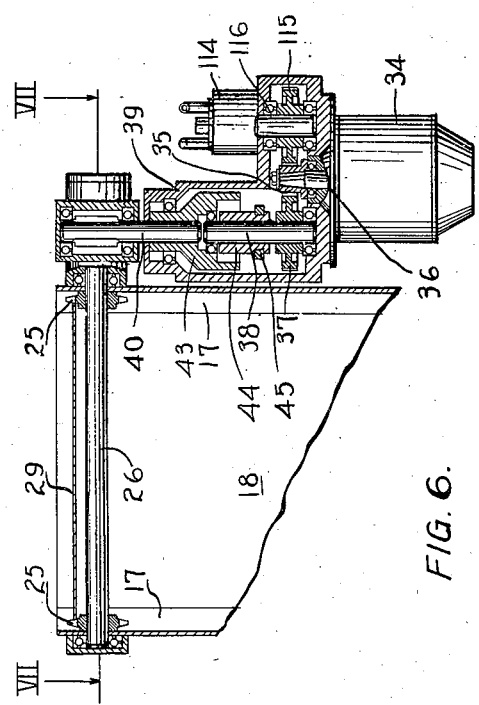
FIG. 6.
INVENTOR.
George M. Butters.
BY
Harold W. Hawkins.
ATTORNEY

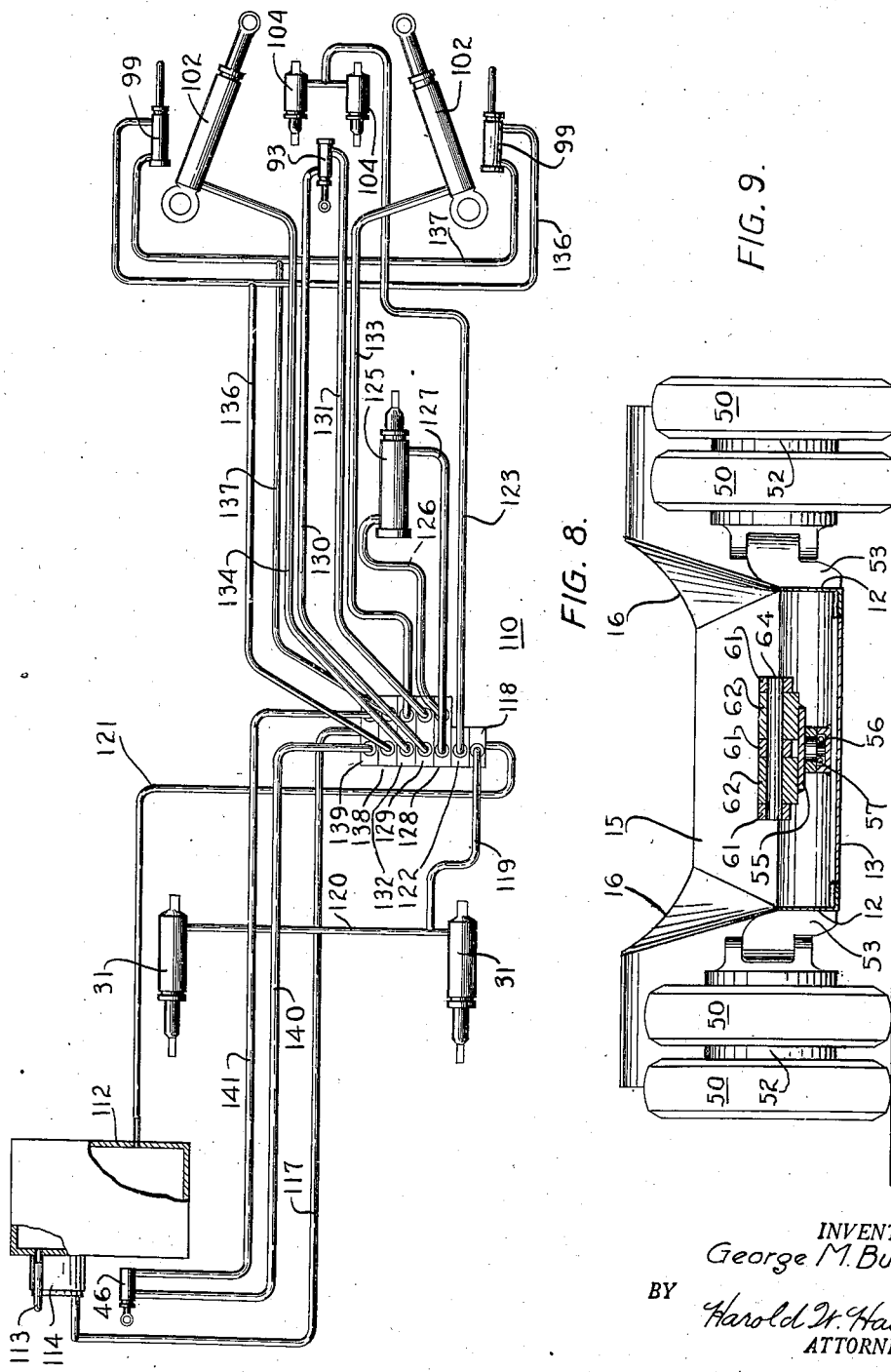

Patented May 12, 1942

2,282,704

UNITED STATES PATENT OFFICE 2,282,704

AUTOMOTIVE VEHICLE WITH DETACHABLE LOADING HEAD

George M. Butters, Franklin, Pa., assignor to Joy Manufacturing Company, a corporation of Pennsylvania Application September 11, 1939, Serial No. 294,278

18 Claims. (Cl. 214—83)

This invention relates to haulage and loading units adapted especially for service as secondary haulage units in underground mines for gathering mined material, such as coal, at the working face, loading the gathered material therein for transportation from the face to a suitable discharge station where the mined material is unloaded onto a suitable receptacle, such as an endless conveyor or a train of mine cars, for transportation from the mine to the surface.

At the present time haulage units consisting of automotive rubber tired vehicles are used for the secondary haulage in mines to receive the mined material, such as coal, from the mobile mechanical loaders at the working face and convey the same to a transfer station where the coal in the vehicle is unloaded and transferred into the main haulage unit of the mine, such as an endless belt conveyor, track mounted mine cars, and the like. In each such installation, however, known to me, the secondary haulage unit is separate and distinct from the mobile loader, and each performs its function separately and independently of the other.

The primary object of this invention is to provide a combined loading and haulage apparatus for use particularly in underground mines.

Another object is to provide a combined loading machine and material transporting car for use in underground mines and in which the gathering and loading device is detachably connected to the haulage unit and is a part thereof during the loading operation, and is detached therefrom at the end of the loading operation and left at the working face, while the haulage vehicle is transporting the loaded coal to the transfer station, in position to be picked up and combined with a second haulage vehicle whereby the gathering and loading device may be completed and the second haulage unit loaded.

Another object is to provide a vehicle for performing the secondary haulage service in mines comprising an automotive vehicle having a large load carrying compartment therein and a gathering and loading device detachably connected thereto, and operated, when attached to the vehicle by power delivered to the device from the vehicle.

A still further object is to provide an automotive, rubber tired vehicle having a load carrying compartment therein and on which a device is detachably mounted for gathering material from the floor on which the vehicle travels and delivering the same into the load carrying compartment thereof, and from which the material is discharged or unloaded by an endless conveyor operable along the bottom of the load carrying compartment.

A still further object is to provide a combined loading and material transporting machine for use in mines, which is self-propelled, rugged in construction, positive in operation, easily maneuvered into and through the various mine chambers, capable of carrying large quantities of material at one time, and in which the various operating parts of the machine are actuated and controlled from a single position adjacent the side of the machine.

These and other objects which will hereafter be made apparent to those skilled in this particular art are accomplished by means of this invention, one embodiment of which is described in the following specification and illustrated in the accompanying drawings wherein:

Fig. 3 is an enlarged view showing the forward end of the vehicle with the loading device separated therefrom, the loading device being shown partially in section for convenience of illustration;

Fig. 4 is a sectional view taken on line IV—IV of Fig. 3 and showing the parts in their separated or detached positions;

Fig. 5 is a longitudinal section of the haulage vehicle having the forward end removed;

Fig. 6 is an enlarged partial section of the haulage vehicle at the discharge end thereof and showing the mechanism for operating the conveyor traveling over the bottom of the load carrying compartment;

Fig. 7 is a sectional view taken on line VII—VII of Fig. 6;

Fig. 8 is an enlarged diagrammatic view illustrating the hydraulic system for actuating the various operating elements of my improved vehicle; and Fig. 9 is a section taken on line IX—IX of Fig. 1.

Figure 1:
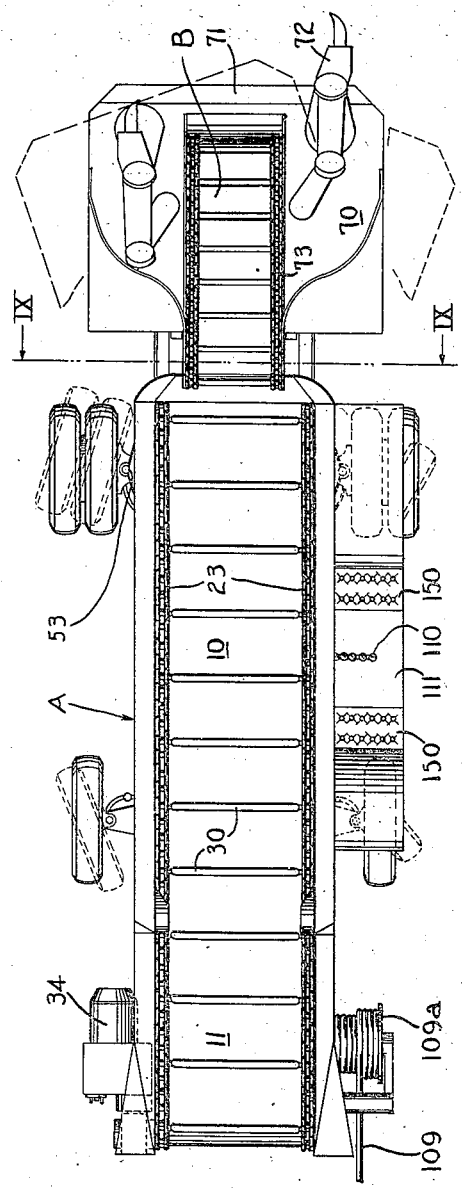
Fig. 1 is a plan view of a haulage and loading vehicle made in accordance with my invention.
Figure 2:
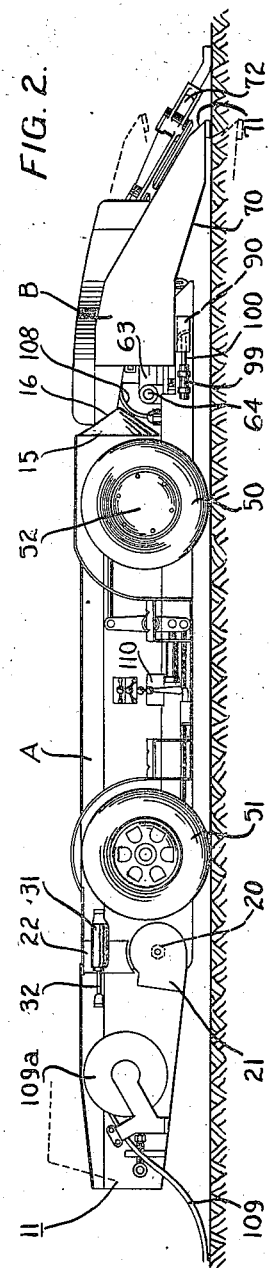
Fig. 2 is a view in side elevation of the apparatus shown in Fig. 1.

As shown in Figs. 1 and 2, my improved haulage and loading unit comprises an automotive vehicle A having a load carrying compartment 10 provided with a vertically swingable discharge section 11 at one end thereof, and a gathering and load device B detachably coupled to the front end of the vehicle A. The automotive load carrying vehicle A is fabricated and built up from metal shapes and plates and comprises side angles 12 which extend the full length of and form the chassis for the vehicle A. The angles 12 are connected together by a bottom plate 13 secured between the horizontal legs of the angles 12 in any suitable manner, such as by welding, and an upper plate 13a having its side edges secured to the vertical legs of said angles to provide a frame of substantially box like construction for said car. Secured to the top of the upright legs of the angles 12 are plates 14 forming the side walls of the load carrying compartment 10, of which the plate 13a forms the floor or bottom. The side walls 14, which may be inclined or sloped outwardly, if desired, to increase the capacity of the load carrying compartment, terminate somewhat back of the forward ends of the side angles 12 and a curved or bowed wall 15 is attached between the walls 14 to close the forward or loading end of the load carrying compartment 10. The upper edge of the wall 15 is dished out, as at 16, in its central portion to receive the conveyor of the loading device B, when the device is mounted on the vehicle A, as will be more fully described hereafter.

The discharge section 11 of the vehicle, which is pivoted to the angles 12, is also fabricated and built up of shapes and plates and comprises side angles 17 having their horizontal legs extending toward each other and connected together by a bottom plate 18, which may be welded thereto, and an upper plate 18a, having its side edges secured to the upright sides of the angles 17 to provide a frame similar in shape and construction to the main frame of the vehicle. Plates 19 are secured to the vertical legs of each of the side angles 11 and form the side walls of the discharge section of my improved vehicle.

The side members 17—17 of the discharge section are spaced somewhat closer together than the side members 12—12 and extend between the rear ends of the angles 12, to which they are secured by suitable bolts 20, and hinge plates 21—22, which permit the discharge section to be raised or lowered relative to the main section of the load carrying compartment 10.

Within the main section of load carrying compartment 10 and the discharge section 11 are endless conveyor chains 23 which, at their front ends, pass around a roll 24 journaled in the side angles 12, and at their rear ends pass around sprockets 25 secured to a shaft 26 which is journaled in the side angles 17. The upper reaches of the chains 23 ride on the floor plates 13a—17a and the lower reaches ride on the horizontal flanges of the angles 12 and 17, and to eliminate obstructions to the chains and to permit the chains to operate freely over the bottom of the vehicle A, forward end of the plate 18a in the discharge section is positioned so that it extends underneath the rear end of the plate 13a while the flanges on the angles 17 ride on the flanges of the angles 12. Flights 30 are secured between the chains 23 in spaced relation to each other to carry the material from the main section of the load carrying compartment 10 into and through the discharge section 11 thereof.

In order to vary the elevation of the discharge opening of the section 11 to permit the car to discharge or unload into receiving receptacles of different heights, a cylinder 31 is secured to each of the side walls 14, and has its operating piston connected by a rod 32 to the side wall 19 of the discharge section 11. By controlling the admission of hydraulic fluid into and out of the cylinder 31 (as will be described hereafter), it is apparent that the opening of the discharge section 11 may be positioned and held at the desired elevation.

The conveyor chains 23 are driven by the sprockets 25 on the shaft 26, which, in turn, is driven by an electric motor 34 mounted on one of the side walls 19 of the discharge section 11. A pinion 35 is secured to the motor shaft 36, and meshes with a gear 37 secured to a shaft 38 journaled in a housing 39 on the side wall 19. The housing 39 also has a shaft 40 journaled therein in alignment with shaft 38 which has a worm 41 secured thereto which drives a worm gear 42 secured to the shaft 26. A clutch is provided for connecting the shaft 38 to the shaft 40, having one element 43 secured to the shaft 40 and having another element 44 splined to the shaft 38 which is adapted to be moved into and out of engagement with the clutch element 43 by means of a collar 45 of the usual construction, and operated by means of a hydraulic jack 46.

A vehicle A is supported on rubber tired wheels 50—51. The wheels 50 which form the drive wheels of the vehicle and are mounted on and driven by the electric motors 52 which are pivoted to brackets 53, one secured to each of the side members 12. The wheels 51 are mounted on stub axles pivoted to brackets 54 secured to the side members 12. The drive from the motors 52 to the wheels 50 is the same as that described in Arentzen application Serial No. 277,627, filed June 6, 1939, and all four wheels are turnable to provide 4-wheel steering for the vehicle, substantially the same as that described in the aforesaid application.

In front of the shaft 24 and the side wall 15, a platform 55 is mounted on the plate 13 for lateral swinging movement on a vertical pin 56 which is journaled in a bearing 57 carried by the plate 13. The forward end of the platform 55 is provided with a depending arm 58 having a flanged roller 59 mounted thereon which engages and rides on an arcuate track 60 laid on the floor 13 and secured at each end to the horizontal flanges of the angle members 12. On the upper surface of the platform 55 are upwardly projecting apertured brackets 61 to which the apertured arms 62 on a member 63 are pivoted by a pin 64 to permit the member 63 to be swung in a vertical plane. The platform 55 and the member 63 carried thereby from the support for the gathering and loading device B, which is adapted to be detachably connected thereto.

The gathering and loading device B comprises a head 70, terminating in an inclined nose 71, adapted to slide over the floor of the mine when the vehicle is in operation and over which coal is pushed by gathering arms 72 onto an elevating endless chain and flight conveyor 73 operating in a trough or channel 74 in the head. The arms 72 are mounted on crank arms 75, journaled in the head 70, and in order to drive the crank arms and operate the gathering arms 72, a transversely extending shaft 76 is mounted in the gathering head and has two small helical pinions 77 thereon, which mesh with helical gears 78 on the crank arms 75. To drive the shaft 76, a sprocket 79 is secured to one end thereof which is engaged by a sprocket chain 80 passing therearound and around a sprocket 81 on the end of the driven shaft 82 of a suitable speed reducing unit 83 which is driven from the electric motor 84.

To drive the conveyor 73, which extends around the shaft 76 and around an idler shaft 85 extending transversely of the head and journaled in the side walls of the channel 74, sprockets 86 are secured to the shaft 76 which engage the side chains of the elevating conveyor.

In order to hold the loading device B in proper position to be picked up by the vehicle A, the rear end of the head 70 is supported on foldable, depending spaced legs 90 secured to the head by spring hinges 91 which yieldably urge and hold the legs in head supporting position.

Assuming that the gathering and loading device B is disconnected from the vehicle A and it is desired to pick up the head preparatory to loading the vehicle, the vehicle is driven toward the loading device B and guided so that the member 63, which tapers from its pivot toward its outer end, will pass between guiding lugs 92 depending from the gathering head 70 on each side thereof until the legs 90 are lifted off of the ground and the lugs engage the sides of the member 63 and prevent that member from extending further beneath the head. With the head in this position the rear end of the trough carrying the conveyor 73 projects into the car 10 through the dished opening 16 in the end wall 15. A hydraulic cylinder or jack 93 mounted on the member 63 and having its piston attached by a rod 94 with an articulated linkage 95 is then actuated. On operation of the jack 93, the rod 94 is pulled into the cylinder and forces pins 96 mounted in guides 97 on the member 63 outwardly into locking engagement with eyes 98 which are secured to the bottom of the head 70 on each side thereof. As soon as the pins 96 are inserted into the eyes 98 and the gathering and loading device B thus locked to the member 63, cylinders or jacks 99 mounted on the side angles 12 are actuated to move the piston rods 100 thereof outwardly into contact with the legs 90, and as the movement of the rods 100 continues, the legs 90 are turned to their inoperative position so that the gathering device B rests entirely on the member 63. With the gathering device B in this position the vehicle A is driven to the working face where the head 70 is swung laterally to the desired position for loading.

In order to turn the platform 55 and the member 63 which supports the gathering device B, a hydraulically actuated cylinder or jack 102 is pivoted to each of the side angles 12 and has its operating piston connected by a rod 103 to the sides of the platform 55. To turn the member 63 about the pin 64 and elevate the gathering and loading device B, carried thereby, a hydraulically operated cylinder or jack 104 is pivoted to a bracket 105 depending from the platform 55 and has its operating piston connected by a rod 106 with a bracket 107, depending from the bottom of the member 63.

From this construction it is apparent that when the cylinders 102 are actuated the member 63 and the gathering device B carried thereby can be swung laterally to either side of the vehicle A, and when the cylinder 104 is actuated, the member 63 and the head will be raised or elevated to the desired position.

After the vehicle arrives at the working face, the forward motion is stopped and the operator then couples the conduit 108 leading to the motor 84 to a power outlet 108a provided on the plate 13 adjacent the forward end of the machine and which is supplied with power from a cable 109 connected to a suitable source of supply. The cable 109, which also delivers power to the motors 34 and 52, is preferably wound on a reel 109a operated in the usual manner to play out cable when the car is moving away from the source of power, and to wind up the cable when moving toward the source of power. After the connection has been made, the operator returns to the control station and by manipulating the proper controls starts the motor 84 to operate the gathering arms 72 and the conveyor 73 and the motor 34 to operate the conveyor 23 and the hydraulic system, as will hereinafter be explained.

As the mineral is delivered to the load carrying compartment 10 by the conveyor 73, it piles up adjacent the front wall 15, and when the front end of the vehicle is fully loaded, the jack 45 is actuated to engage the clutch elements 43—44 and drive the chains and flight conveyor 23—30, which conveys the mineral toward the discharge end of the car. This conveyor is run intermittently so that the vehicle may be fully loaded.

After the vehicle A has been fully loaded the operator shuts off the motor 84 and uncouples the conduit 108 from the power outlet 108a. The cylinders 99 are then energized to withdraw the piston rods 100 and permit the spring hinges 91 to return the legs 90 to a substantially vertical position, after which the jack 93 is actuated to withdraw the pins 96 from the eyes 98 to disconnect the loading device B from the vehicle A. As soon as the head B has been disconnected from the supporting member 63, the motors 52 are started to drive the vehicle backward to the load transfer station. Since the nose 71 of the head 70 rests on the ground, it will not be carried back by the vehicle, but the vehicle will back out from under the head, which will remain at the face in position to be picked up again when the vehicle returns from the transfer station. Upon arriving at the transfer station the clutch element 44 is moved into engagement with clutch element 43 to drive the conveyor chains 23, and the load in the compartment 10 is discharged into a suitable receptacle, such as an elevator, which loads the coal into a string of cars or onto an endless belt conveyor.

For efficiency of operation I prefer to work at least two vehicles A with each loading device B, and while one vehicle is proceeding to the transfer station the other vehicle picks up the loading device B to gather and deliver the mined material into the last mentioned vehicle.

Fig. 8 illustrates schematically the hydraulic system for my haulage and loading apparatus, the control box 110 of which is positioned adjacent an operator's platform 111 on the side of the vehicle, and the electrical control switches for operating the motors 34, 52 and 84 are connected to the side wall 14 adjacent the platform so that all of the controls for the various operating units of the car will be within the easy reach and readily accessible to the operator. As illustrated in Fig. 8, a storage tank 112 for hydraulic fluid is mounted on the side wall 19 of the discharge section of the vehicle adjacent the motor 34, which is connected by a conduit 113 with the intake side of a continuously driven pump 114. To drive the pump 114 a gear 115 is secured to the pump shaft 116 which meshes with the pinion 35 on the motor shaft 36. The outlet side of the pump 114 is connected by a conduit 117 with the control box 110, which consists of a series of valves, one for each of the hydraulic units of the car. Valve 118 of the control box is connected through conduits 119—120 with the cylinders 31 which control the elevation of the discharge section 11 of the vehicle. The cylinders 31 are of the single acting type and, when energized, raise the discharge section, and when deenergized, permit the discharge section to gravitate to its lowermost position and return the hydraulic fluid therein to the tank 112 through the conduit 121 leading from the control box to the tank. The admission of fluid pressure to the jacks 104, which control the raising of the member 63, is controlled through a valve 122 having a conduit 123 leading to the rear ends of cylinders 104. The cylinders 104 are also of the single acting type and the weight of the gathering and loading device B is depended upon to return the cylinders to their contracted position. The cylinder 125 which controls the steering of the vehicle, as described in the aforesaid Arentzen application, is of the double acting type and is connected by conduits 126—127 with a valve 128 in the control box 110. By proper manipulation of the valve 128, fluid can be delivered to either end of the cylinder 125 and the wheels turned in the desired direction of travel. A valve 129 having conduits 130—131 leading to the jack 93 controls the movement of the pins 96 into and out of locking engagement with the eyes 98. A valve 132 having conduits 133—134 leading therefrom to the rear ends of the cylinders 102 is provided for controlling the admission of fluid to said cylinders to control the swinging of the platform 55. The jacks 102 are also of the single acting type, and are so arranged that when one is energized the other is deenergized. The jacks 99 which move the legs 90 of the gathering head into inoperative position are of the double acting type and have conduits 136—137 leading to a valve 138 in the control box. Valve 139 has conduits 140—141 leading therefrom to the jack 46 and controls the operation of the sliding clutch element 44.

From the foregoing description of my invention it is apparent that I have provided a combined loading and secondary haulage unit for use in underground mines, which is self-propelled, readily maneuverable about in the mine since all wheels are guided, and rugged in construction to withstand the hard usage and abuse such equipment receives in mines, and in which the loading device may be readily and quickly attached to and disconnected from the haulage vehicle, since the controls, including the controls for attaching and detaching the loading device to the vehicle, with the exception of the cable connection for delivering power to the motor carried by the gathering device, are located adjacent the operator's platform at the side of the car.

It is preferred not to turn the haulage vehicle when in use, but to drive it in one direction to the working face where it is loaded, and in the opposite direction to the transfer, or unloading station. To facilitate the driving of the car in opposite directions, seats 150 are provided on each side of the platform and the controls are so located and so arranged adjacent the platform that the operator can easily operate the same from either seat. Consequently, the operator will always face in the direction of travel of the car where he has unobstructed vision of the path of travel of the car through the mine chambers.

It is also apparent that other exemplifications of my improved hauling and loading unit may be made and that certain modifications, additions and subtractions may be made therein within the spirit of my invention and the scope of the appended claims.

I claim:

1. Apparatus for loading and transporting material comprising an automotive vehicle having a load carrying compartment therein, a supporting platform at one end of said vehicle, a gathering and loading device supported on said platform for delivering material into said load carrying compartment, fluid actuated means for detachably connecting said device to said platform and means for swinging said platform and said device laterally with respect to said vehicle.

2. Apparatus for loading and transporting material comprising an automotive vehicle having a load carrying compartment therein, a platform pivotally mounted on one end of said vehicle, a device mounted on said platform for gathering and delivering material into the load carrying compartment, a locking bar for detachably connecting said device to said platform, means for operating said locking bar and means for turning said platform to swing said device laterally.

3. A mine haulage and loading unit comprising an automotive vehicle having a load carrying compartment therein, a platform pivotally mounted on one end of said vehicle for lateral swinging movement, a member mounted on said platform for vertical swinging movement, means on said member for releasably connecting a gathering and loading device thereto, means for swinging said platform laterally and means for elevating said member.

4. A mine haulage and loading machine comprising an automotive vehicle having a load carrying compartment therein, a platform mounted on said vehicle for turning movement about a vertical axis, a member for supporting a gathering device mounted on said platform for swinging movement about a horizontal axis, means for swinging said platform to turn said gathering device supporting member laterally, and means for swinging said gathering device supporting member to vary the elevation thereof.

5. A mine haulage and loading apparatus comprising an automotive vehicle having a load carrying compartment, a platform pivotally mounted on said vehicle for supporting a power driven gathering and loading device, means on said platform for detachably connecting the device to said platform, means for swinging said platform about its pivot, means for supplying power to said vehicle, and an electric power outlet on said vehicle, for delivering power to the gathering and loading device carried by said platform.

6. A mine haulage and loading unit comprising an automotive vehicle, having a load carrying compartment therein, a platform mounted on one end of said vehicle for swinging movement about a vertical axis, a gathering and loading device supporting member mounted on said platform for swinging movement about a horizontal axis, means on said member for detachably connecting thereto the device supported thereon, means for turning said platform to swing said device supporting member laterally and means for swinging said device supporting member to vary the elevation thereof.

7. In combination, a gathering and loading device having resilient means for supporting the same in upright position, an automotive vehicle having a member pivoted thereto and adapted to extend under said device, means for moving said member into supporting engagement with said device, means carried by said member for detachably connecting said device thereto, and means on said vehicle for moving said device supporting means to an inoperative position when said device is connected to said member.

8. In combination, a gathering and loading device, depending legs pivoted to said device for holding the same in upright position, means for continuously yieldingly urging said legs into device supporting position, an automotive vehicle having a member thereon adapted to receive and carry said device, fluid actuated means on said member for detachably connecting said device thereto, and fluid actuated means carried by said vehicle adapted to engage and turn said legs to an inoperative position when said device is connected to said member.

9. In combination, a gathering and loading device having means for supporting the same in upright position, an automotive vehicle adapted to extend under and engage said device, fluid actuated means for detachably connecting said device to said vehicle, and fluid actuated means on said vehicle for moving said device supporting means to an inoperative position, when said device is connected to said vehicle.

10. A self-loading mine haulage apparatus comprising an automotive vehicle having a load carrying compartment therein, a member pivotally mounted on one end of said vehicle for supporting a gathering and loading device, locking means carried by said member adapted to detachably connect a gathering and loading device thereto, and fluid actuated means for operating said locking means.

11. A self-loading mine haulage apparatus comprising an automotive vehicle having a load carrying compartment therein, a member pivotally mounted on one end of said vehicle for supporting a gathering and loading device, locking means on said member adapted to detachably connect a gathering and loading device thereto, means on said vehicle for actuating said locking means and means for swinging said member laterally.

12. A self-loading mine haulage apparatus comprising an automotive vehicle having a load carrying compartment therein, a platform mounted on one end of said vehicle for lateral swinging movement, a supporting member for a gathering and loading device mounted on said platform for vertical swinging movement, means for swinging said platform laterally, and means for elevating said device supporting member relative to said platform.

13. In a self-loading mine haulage apparatus, the combination with a gathering and loading device, having spaced depending legs continually urged to a position for holding said device upright, of an automotive vehicle having a load carrying compartment therein, a member on one end of said vehicle adapted to support said device when extended thereunder, means on said member for releasably locking said device to said member, and means on said vehicle adapted to engage and move the legs of said device to an inoperative position when the device is supported on said member.

14. In a self-loading mine haulage apparatus, the combination with a gathering and loading device, having spaced depending legs continually urged to a position for holding said device upright, of an automotive vehicle having a load carrying compartment therein, a member on one end of said vehicle adapted to support said device when extended thereunder, means on said member for releasably locking said device thereto, means for laterally swinging said member, and means on said vehicle adapted to engage and move said legs to an inoperative position when said device is supported on said member.

15. In a self-loading mine haulage apparatus, the combination with a gathering and loading device, having spaced depending legs continually urged to a position for holding said device upright, of an automotive vehicle having a load carrying compartment therein adapted to pick up and support said gathering and loading device during the loading of said vehicle, a member on one end of said vehicle adapted to support said device when extended thereunder between the depending legs thereof, means for laterally swinging said member, means for elevating said member and the device adapted to be carried thereby, and means on said vehicle adapted to engage and move the legs of said device to an inoperative position when said device is supported on said member.

16. In a self-loading mine haulage apparatus, the combination with a gathering and loading device, having spaced depending legs continually urged to a position for holding said device upright, of an automotive vehicle having a load carrying compartment therein adapted to pick up and support said gathering device during the loading thereof, a member on one end of said vehicle adapted to support such device when extended thereunder between the spaced depending legs, means on said member for releasably locking said device to said member, means for elevating said member and the device adapted to be carried thereby, and means on said vehicle adapted to engage and move said legs to an inoperative position when said device is supported on said member.

17. In a self-loading mine haulage apparatus, the combination with a gathering and loading device, having space depending legs continually urged to a position for holding said device upright, of an automotive vehicle having a load carrying compartment therein and adapted to pick up and support said gathering and loading device during the loading of said vehicle, a member on one end of said vehicle adapted to support said device when extended thereunder between the depending legs thereon, means on said member for detachably connecting and locking said gathering device thereto, means carried by said vehicle adapted to engage and move said legs to an inoperative position when said device is supported on said members, fluid actuated means for laterally swinging said members and the device carried thereby, and fluid actuated means for elevating said member.

18. In a self-loading material transporting apparatus, the combination with a gathering and loading device of an automotive vehicle, having a load carrying compartment therein, a member on one end of said vehicle for supporting said gathering and loading device, means for releasably securing said gathering and loading device to said member, means for raising and lowering said member to vary the elevation of the gathering and loading device carried thereby and means for turning said member laterally to swing the gathering and loading device from side to side.

GEORGE M. BUTTERS.